Oct. 1, 1935.  C. G. MUNTERS  2,016,045
HEAT INSULATION
Original Filed Feb. 26, 1932
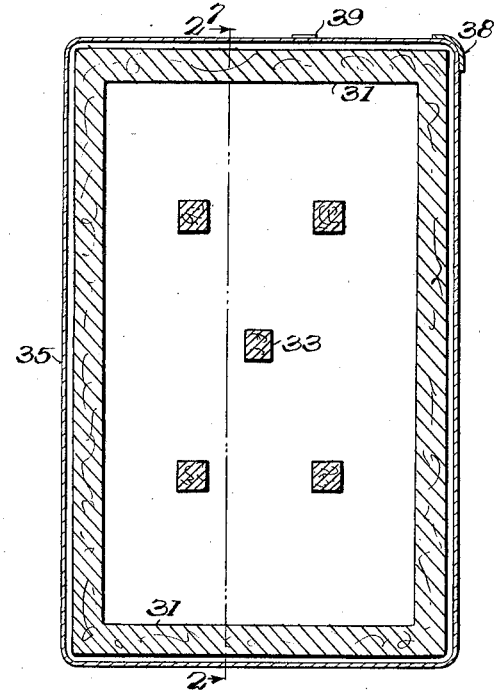
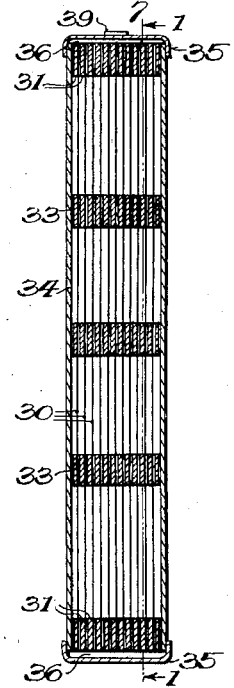
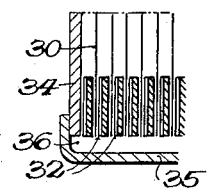
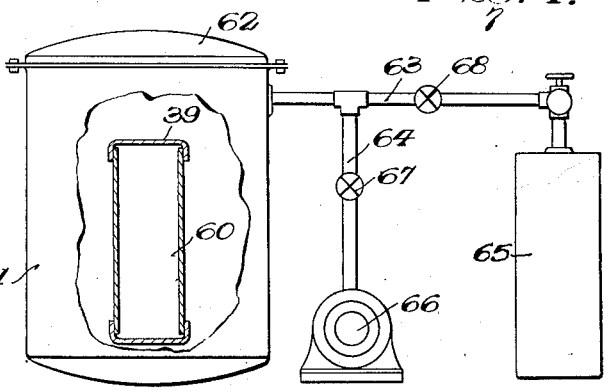
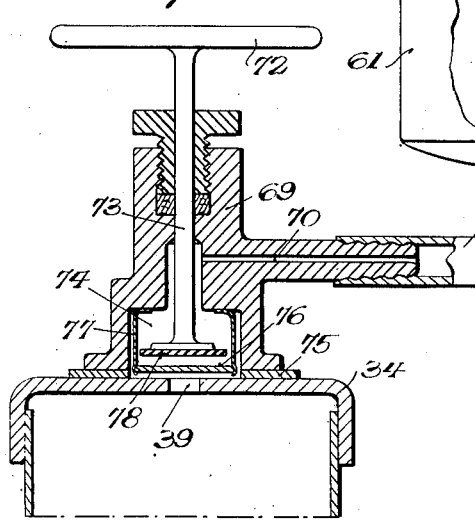
Inventor
Carl Georg Munters
By Cameron, Kerkam & Sutton
Attorneys Patented Oct. 1, 1935

2,016,045

UNITED STATES PATENT OFFICE 2,016,045

HEAT INSULATION

Carl Georg Munters, Stockholm, Sweden

Original application February 26, 1932, Serial No. 595,411. Divided and this application August 24, 1933, Serial No. 686,633. In Sweden March 3, 1931

10 Claims. (Cl. 154—28)

The present invention relates to a process for charging heat insulating elements with gas, particularly a gas of lower heat conductivity than air, and has more especial reference to the charging of hermetically sealed heat insulating elements containing means for preventing heat transmission by radiation and convection through the same of the character described in my copending application Serial No. 595,411, filed February 26, 1932, of which this application is a division.

It is an object of the present invention to provide a process for charging insulating elements which enables the insulating elements to be evacuated to a desired extent and filled with suitable gas without subjecting their exterior walls to differential pressures of injurious magnitude, whereby the walls of the elements can be made of comparatively thin material and light weight.

A further object of the invention is to provide a process for charging insulating elements with a suitable gas which is simple, and also economical with respect to gas consumption.

The invention is capable of being employed in conjunction with insulating elements of a wide variety of constructions and by means of apparatus of a wide variety of forms, one of each of which is shown for purposes of illustration on the accompanying drawing, forming part of this specification, but it is to be expressely understood that the invention is not limited thereto.

In said drawing,

Fig. 1 is a sectional view of a heat insulating element taken along the line 1—1 in Fig. 2;

Fig. 2 is a sectional view of said heat insulating element taken along the line 2—2 of Fig. 1;

Fig. 3 is a fragmentary view of a corner of said heat insulating element on a larger scale;

Fig. 4 is a view partly in section schematically illustrating an apparatus for carrying out the process for filling a heat insulating element; and Fig. 5 is a view on a larger scale of a device for hermetically sealing the heat insulating element after it is filled with a gas at a predetermined pressure.

Figures 1 to 3 illustrate a heat insulating element of preferred construction, but it is to be expressly understood that the heat insulating element as shown is to be taken as typical of any suitable heat insulating element with which the present invention may be employed. In the form shown, 30 are partitions of suitable material such as aluminum foil spaced by frames 31 of felt, a porous paper composition, or like material having a low heat conductivity, and which frames may be suitably stiffened by means of similarly formed frames 32, of a suitable material such as cardboard, pasted thereto and rendering the same sufficiently rigid for their easy handling during manufacture. Said frames are also preferably attached to said foils 30, as by pasting. Spacing elements of poor heat conductivity, such as felt and cardboard pieces 33, are also preferably interposed between, and may be pasted to, the foils 30 to keep them spaced.

Two plates 34, which may be corrugated or otherwise formed and are of such thickness as to give the element sufficient strength and resistance against outer shocks or the like to prevent the same from being injured or destroyed, form the sides of the heat insulating element, and are made of aluminum, iron, or any other suitable material. The walls 35 surrounding the element in transverse direction, and between which and the frames 31 in the present case a narrow space 36 is left, are made of a material of low heat conductivity such as for instance cellon, celluloid, polopas, or the like, or the walls 35 may be made of thin metal or metal alloys of poor heat conductivity, for instance nickel to about 40–50% and iron. In case the walls 35 are formed of cellon or like material they may be bent over the plates 34 and pasted thereto on the sides by a suitable paste, for instance a mixture of cellon with vinapas dissolved in acetone, the walls 35 being thereby secured to the plates 34 so as to form an hermetically closed element. The same mixture may be used for pasting the cardboard frames to the foils and to the felt frames, etc.

At least every second of the foils 31 is provided with bright heat reflecting surfaces for the purpose of counteracting the heat transfer through the element due to radiation and may consist of very thin metal such as aluminum. The other foils, i. e. the alternate ones, may consist of paper or the like having surfaces of less heat reflecting capacity, as they mainly serve the purpose of preventing convection currents in the gas in the spaces between the adjacent foils. The construction so provided constitutes means for counteracting heat transfer through the element due to convection, while it decreases the cost of the element without decreasing its high heat insulating capacity.

The outer transverse walls of the element are shown as slightly bent at the corners in order to facilitate their attachment to the side plates 34. These transverse walls are preferably pasted or otherwise tightly fastened together, as shown for instance at one of the corners, and a piece 38 covering the seam may be employed. Experiments have shown that by the use of cellon as the material of the transverse walls, when pasted to the side plates by the paste above mentioned, it is possible to produce a heat insulating element which can be hermetically sealed after it is filled with a suitable gas of poor heat conductivity, such as sulphur hexafluoride or any other gas suitable for the purpose in question.

The spaces between the foils 30 within the hermetically closed element, as more fully described hereinafter, are to be filled, through a suitable filling opening 39, with a gas or gas mixture having a poor heat conductivity, preferably a gas having a substantially lower heat conductivity than air at a corresponding pressure, such as compounds of halogens and/or sulphur, for instance sulphur hexafluoride, dichlorodifluoromethane. For the purpose of introducing the gas into all spaces of the element the felt frames may be provided at certain places with small holes or the like. The plates 34 should have a thickness sufficient to withstand fluctuations of pressure of about 100 mm. of mercury between the pressures acting on the inside and the outside of the element, due to changes in atmospheric pressure. When the heat insulating element according to the invention is constructed in the form described in connection with Figs. 1–3, it is preferable although not essential to use a gas pressure which is near to the atmospheric pressure but somewhat below the same, a difference of say 150 to 250 mm., as in such case the pressure acting on the outside of the element tends to maintain the felt frames and the spacing elements 34 in their proper places.

Fig. 4 diagrammatically illustrates an apparatus suitable for carrying out the process of the present invention for filling insulating elements with gas, in which an atmospheric pressure or nearly atmospheric pressure should exist. One or more insulating elements 60 are placed within a vessel or room 61 which is hermetically closed by means of a cover 62. The vessel is connected by means of conduits 63 and 64 with a gas tank 65 and a vacuum pump 66, respectively. A valve 67 is provided in conduit 64, while a valve 68 is provided in conduit 63.

A vacuum is first produced in the vessel 61 by the pump 66, and thereby also in the elements 60, and after the removal of the air from the vessel 61 and the interior of the elements 60, valve 67 is closed and the valve 68 is opened, thus allowing the gas with which the elements are to be filled to flow through conduit 63 into said vessel and elements. When the desired pressure is reached in the vessel, valve 68 is again shut off, cover 62 removed and the elements taken out for hermetically sealing their filling openings or apertures 39. This sealing may be carried out by pasting over the opening a plate of cellon or the like, as by means of a paste such as above described. However, other methods of sealing the elements may also be used, as for instance screws, cocks, the melting together of a glass filling tube or aperture, or the like.

It is apparent that if the air is removed from the elements and the gas introduced into the same in accordance with the method above described substantially the same pressure will always prevail inside and outside the element both during the period when the air is being removed and when the gas is being introduced thereinto. This insures that the filling can in no way injure the structure of the element because of the difference in pressure acting exteriorly and interiorly of the element.

In cases where a somewhat lower pressure than the atmospheric is desired within the element the desired pressure can be obtained by means of the device illustrated in Fig. 5, which shows said device placed above the filling aperture 39 of the element. Said device includes a casing 69 having a conduit 70 here shown as connected by means of a rubber hose or the like 71 to a vacuum source. A stem 73 having a handle 72 and a head 78 is mounted for axial movement in said casing 69. At its lower end the casing 69 has a chamber 74 communicating with the vacuum source through the conduit 70. A rubber washer or the like 75 is provided between the casing 69 and the element. A sealing plate 76 is disposed within the chamber 74 and suitably supported therein as by means of two or more springlike members 77.

After the element is charged with gas as heretofore described it may be placed in communication with the vacuum source, for instance a vacuum pump, and a certain amount of the gas may be sucked out of the element. When the vacuum desired in the element is thereby reached, the communication may be closed and the stem 75 pushed inwardly to remove the sealing plate 76 from the spring members 77 and push it against the transverse wall 34 of the element, where it can be retained in position in any suitable way as by means of a paste of the kind previously mentioned. If preferred the chamber 74 can communicate with the interior of the vessel 61 and the device be operated to close the sealing opening 39 when the pressure of the gas within the element has reached the desired magnitude. In either event the device can be removed from its place on the element as soon as atmospheric pressure is admitted to the chamber 74.

It is of great importance when constructing elements in accordance with this invention that the means counteracting heat transfer due to convection be placed at proper distances from each other. Thus the foils described in connection with Figs. 1–3 must be placed more closely to each other the heavier the gas or the lower the viscosity of the gas which is used. I have by experiments ascertained that when one or more of the gases above stated are being used the distance between the foils should not exceed 5 mm. in order to prevent the occurrence of convection. In order to insure under all circumstances that no convection will occur it is preferable to place the foils at a distance of 4 mm.

It has previously been stated that suitable gases with low heat conductivity for filling the elements are sulphur hexafluoride ($SF_6$) and methylchloride ($CH_3Cl$). Other suitable gases may be employed, as for example dichlorodifluoromethane ($CCl_2F_2$), sulphurylfluoride ($SO_2F_2$), methyl bromide ($CH_3Br$), ethyleiodide ($C_2H_5I$), all of which are halogen compounds. Other suitable gases are compounds of sulphur such as sulphur dioxide ($SO_2$) and carbon bisulphide ($CS_2$). A mixture of two or more of said gases may also be used. The gas or gas mixture which is made use of should have a boiling point lower than the lowest temperature prevailing where the element is to be used. The gas chosen for filling the element should furthermore be insoluble in the material of which the element is built and be of such nature that it in no way affects said material.

While the preferred construction of heat insulating element and a suitable apparatus for charging the same have been described with considerable particularity it is to be expressly understood that the invention is not restricted thereto, as any suitable apparatus may be used and the method of the invention may be employed to charge heat insulating elements of any other suitable construction. The invention makes it possible to use thin walls for the insulating elements, even of such thinness that they cannot withstand pressure differences of one atmosphere. In conformity herewith the terms "approximately equal" and "substantially equal" or the like in the appended claims will be used to designate pressures which do not differ during the filling procedure to an extent such as to have an injurious effect on the walls of the insulating element in spite of their thinness, although as hereinbefore noted the external pressure may exceed the internal pressure on the order of 0.3 atmosphere.

What is claimed is:

1. The method of charging with a gas of poor heat conductivity a heat insulating element of the character including a hollow element having external walls that are inadequate to withstand large differences of pressure between the interior and exterior of said element and hermetically sealed except for a filling opening, which includes the steps of evacuating said element through said filling opening while maintaining the difference between the internal and external pressures acting thereon within the limits of a predetermined differential which will not injure said walls, charging said element with said gas through said filling opening while maintaining the difference between the internal and external pressures acting thereon within the limits of said differential, and then sealing said filling opening.

2. The method of charging a heat insulating element with a gas of poor heat conductivity which includes the steps of evacuating the element while maintaining the differential between the pressure acting on the exterior of said element and the pressure within said element less than that sufficient to substantially deform the walls of said element, and thereafter filling said element with said gas while maintaining the differential between the pressure acting on the exterior of said element and the pressure within said element less than that sufficient to substantially deform the walls of said element.

3. The method of charging a heat insulating element with a gas of poor heat conductivity which includes the steps of evacuating said element while maintaining the external pressure acting thereon not more than approximately .3 atmosphere in excess of the internal pressure, and charging said element with said gas to less than atmospheric pressure while maintaining the external pressures acting thereon substantially equal not more than approximately .3 atmosphere in excess of the internal pressure.

4. The method of charging a heat insulating element with a gas of poor heat conductivity which includes the steps of disposing the element in a closed chamber with which said element is in open communication, exhausting the air from said chamber and element, admitting said gas to said chamber and element simultaneously, discontinuing the inflow of gas before the pressure in said element has attained atmospheric pressure, hermetically sealing said element, and then admitting atmospheric pressure to said chamber.

5. The method of charging a heat insulating element which is hermetically closed except for a filling opening and which has external walls that are inadequate to withstand large differences of pressure and which is subdivided interiorly by a plurality of relatively thin closely spaced partitions to counteract transference of heat by radiation and convection, evacuating the spaces between said partitions through said filling opening and apertures in said partitions while maintaining the pressure interiorly and exteriorly of said element approximately equal, charging said spaces through said filling opening and apertures with a gas having a heat conductivity which is low as compared to air at a corresponding pressure while maintaining the pressure interiorly and exteriorly of said element approximately equal, and then sealing said filling opening.

6. The method of charging a heat insulating element which is hermetically closed except for a filling opening and which is subdivided interiorly by a plurality of closely spaced partitions to counteract transference of heat by radiation and convection, which includes the steps of evacuating the spaces between the partitions in said element through said filling opening and apertures in said partitions while correspondingly decreasing the external pressure, admitting gas of poor heat conductivity as compared with air at a corresponding pressure to said spaces through said filling opening and apertures until a gas pressure is produced in said spaces which is less than atmospheric pressure while correspondingly increasing the external pressure to atmospheric pressure, and then sealing said filling opening.

7. The method of charging a heat insulating element with a gas of a heat conductivity which is lower than that of air at a corresponding pressure which includes the steps of evacuating the element while maintaining the pressure interiorly and exteriorly of the same approximately equal and thereafter admitting said gas to said element while maintaining the pressure interiorly of said element not more than approximately .3 atmosphere below the pressure exteriorly of said element.

8. The method of charging a heat insulating element with a gas of poor heat conductivity which includes the steps of evacuating said element while maintaining the external and internal pressures acting thereon substantially equal, charging said element with said gas to a substantially atmospheric pressure while maintaining the internal and external pressures acting thereon substantially equal, then evacuating some of said gas from said element until a predetermined pressure is obtained, and thereafter sealing said element.

9. The method of charging with a gas of poor heat conductivity a heat insulating element of the character including a hollow element having external walls that are inadequate to withstand large differences of pressure between the interior and exterior of said element and hermetically sealed except for a filling opening, which includes the steps of evacuating said element through said filling opening while simultaneously decreasing the external pressures acting thereon, charging said element with said gas through said filling opening until a substantial pressure which is below atmospheric pressure exists therein while simultaneously increasing the external pressure to atmospheric, and then sealing said filling opening.

10. The method of charging a heat insulating element with a gas of poor heat conductivity which includes the steps of evacuating said element while simultaneously decreasing the external pressure acting thereon, and charging said element with said gas to less than atmospheric pressure while simultaneously increasing the external pressures acting on said element.

CARL GEORG MUNTERS.